R. G. BRUNER.
WEEDER.
APPLICATION FILED JUNE 29, 1912.
1,120,371.
Patented Dec. 8, 1914.
2 SHEETS—SHEET 2.
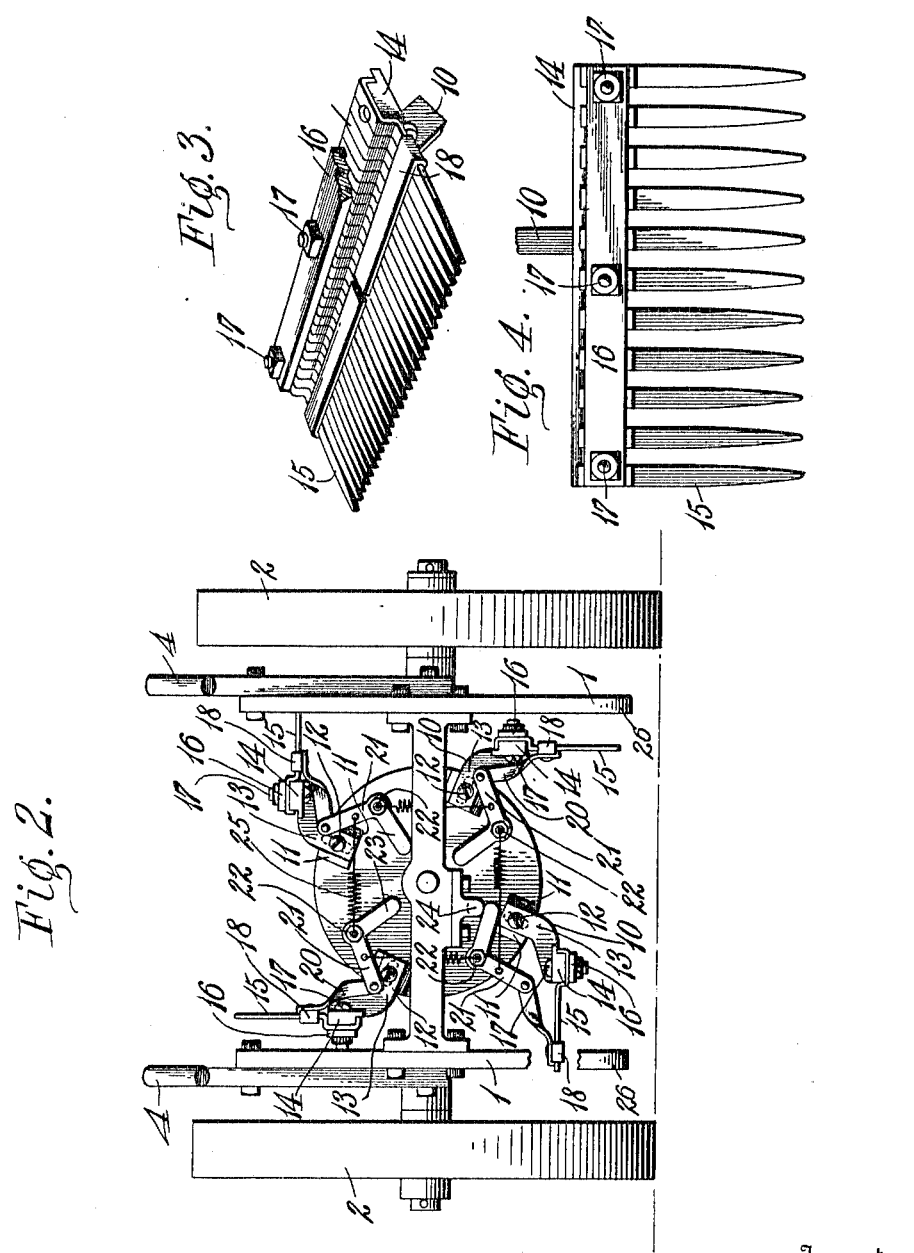
Witnesses
Chas. W. Stauffiger
Anna M. Dorr
Inventor
Reuben G. Bruner,
By 
Attorneys

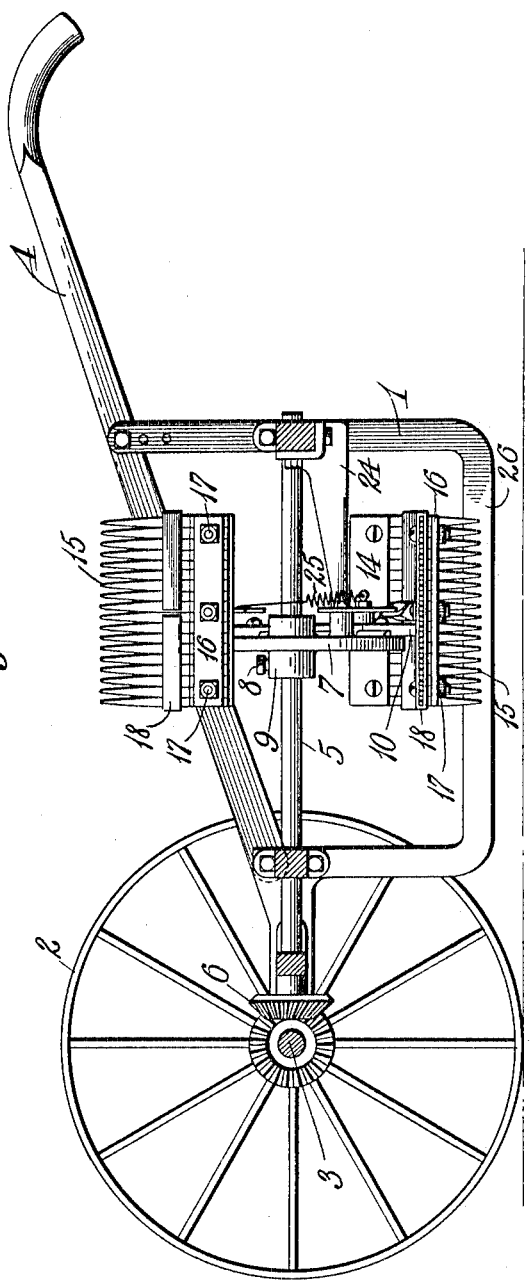

UNITED STATES PATENT OFFICE.

REUBEN G. BRUNER, OF OLINDA, ONTARIO, CANADA.

WEEDER.

1,120,371. Specification of Letters Patent. Patented Dec. 8, 1914.

Application filed June 29, 1912. Serial No. 706,726.

*To all whom it may concern:*

Be it known that I, REUBEN G. BRUNER, a subject of the King of England, residing at Olinda, in the county of Essex and Province of Ontario, Dominion of Canada, have invented certain new and useful Improvements in Weeders, of which the following is a specification, reference being had therein to the accompanying drawings.

This invention relates to weeders and more especially to a machine for weeding onions which is adapted to be propelled by hand along a row of standing plants and comb out the weeds therefrom and deposit the same at one side of the row.

The invention includes the construction of the weeding members whereby they may be adjusted for different conditions of service and whereby they do not become readily clogged.

The invention consists in the matters hereinafter set forth and pointed out in the claims.

In the drawings, Figure 1 is a view, partially in longitudinal section and partially in elevation of one form of machine that embodies features of the invention; Fig. 2 is a view in rear elevation thereof partially broken away; Fig. 3 is a view in detail of a weeding comb; and Fig. 4 is a view showing the comb adjusted for a heavy growth.

Referring to the drawings, a main frame 1 of suitable design to combine strength and lightness and afford appropriate support for the mechanism is carried at its forward end on a pair of traction drive wheels 2 that turn a main shaft 3. Handles 4 extend rearwardly from the frame in a manner common to machines of this type. A longitudinally disposed shaft 5 appropriately journaled in the frame, is driven from the main shaft 3 through any desired connections as for example, a beveled gear train indicated at 6.

A spider 7 is adjustably secured on the shaft 5 to turn therewith, as by means of a set screw 8 passing through the spider hub 9 or by other suitable means. Bracket arms 10 extend from the periphery of the spider at regular intervals, being preferably secured thereto by means affording longitudinal adjustment. As herein indicated the brackets lie between parallel lugs 11 and are adjustably clamped by bolts 12 passing through slots indicated at 13 in the disk of the spider. The latter may be appropriately ribbed if desired, to increase its strength. Each bracket has an outer transverse arm 14 on which a plurality of teeth 15 are secured, the latter being bent to partially embrace the bracket and being secured by a clamping plate 16 held by appropriate means such as bolts 17 or the like. The teeth are arranged to be set close together as in Fig. 3 or disposed in regular intervals as shown in Fig. 4. A stripper in the form of a flat strip bent into a closed loop 18 is reciprocable longitudinally on the teeth 15 of each comb. A stem 20 from each strip is loosely pivoted at its end or otherwise articulated to one arm 21 of a bell crank lever pivoted on a stud 22 on the face of the spider 7. The other arm 23 of the bell crank is so disposed that its extremity encounters a knock-off bar 24 once during each revolution of the spider so that the stripper is moved to the end of the teeth 15 thereby clearing the comb of weeds or other material picked up by the teeth. An appropriately positioned spring 25 returns the stripper and bell crank to its initial position. The knock-off member 24 may be situated as desired on the main frame with a view to operating the strippers at the point desired in their revolution. A pair of runners 26 are formed on the main frame to aid in supporting and steadying the machine on the row along which the machine is being moved.

In operation the machine when made to traverse a row of onions or the like, rapidly moves the weeding members or combs transversely through the row picking up weeds and allowing the onion tops to slip therethrough. The strippers throw the weeds off to one side of the row thereby leaving the latter clear.

One feature of the invention is the disposition of the spider that carries the weeding members between the end portions of the latter so that the weeds and other articles encountered do not tend to become lodged at the ends of the weeding members as they might if the latter were mounted on a drum or other device having end supporting members.

Another feature of the invention is the arrangement of the weeders whereby the teeth may be disposed and adjusted to different conditions of growth in the field to be weeded being spaced to allow onion tops of any size to pass therethrough without injury while the weeds with leaf foliage or branching stems are pulled away.

The knock-off member may be situated as desired so that the ejection of the weeds takes place at any point, each machine being set up to meet the requirements for the use to which it is intended.

As there is a minimum of working parts the machine is easily constructed and when ready for the field is not liable to be injured or thrown out of adjustment.

Obviously, changes in the details of construction may be made without departing from the spirit of my invention and I do not care to limit myself to any particular form or arrangement of parts.

What I claim is:—

1. In a weeder a frame, a shaft journaled longitudinally on the frame, a spider secured to said shaft, bracket arms on the spider periphery, weeding teeth in adjustable spaced relation secured on the outer end of each arm, stripping members each reciprocable on a set of the weeding teeth, means for reciprocating each stripping member, and a knock-off member on the frame adapted to intermittently move the reciprocating means.

2. In a weeder a frame, a shaft journaled longitudinally thereon, a spider secured to said shaft, brackets adjustably secured on the periphery of the spider, stripping teeth in adjustable spaced relation on each bracket, a closed stripper loop embracing each set of teeth, means on the spider for reciprocating each loop longitudinally of the companion teeth, and a knock-off member adapted to intermittently operate the loop reciprocating means.

3. In a weeder, a spider having outstanding brackets adjustably spaced weeding teeth on each bracket, stripper members each reciprocable on the teeth of a bracket, a bell crank for each member pivoted on the spider, a link articulating each bell crank with a companion stripper member, a knock-off member in the path of revolution of said bell cranks for moving the latter successively in one direction, and spring means for retracting the bell cranks.

4. In a weeder, a frame, a shaft journaled therein, a spider secured on the shaft, brackets extending from the spider, weeding teeth secured on each bracket, a stripping member reciprocable on each set of teeth, a bell crank articulated to each stripping member and pivoted on the spider, a knock-off member on the frame in the path of revolution of the bell cranks for moving the latter in one direction, and spring means for retracting the bell cranks.

5. In a weeder, a spider rotatable on an axis longitudinally of the weeder, brackets extending from the periphery of the spider, weeding teeth in adjustable spaced relation on the extremities of the brackets, stripper members each reciprocable on a set of teeth, a bell crank for each stripper member pivoted on the spider, a link articulating each stripper member to a companion bell crank, a knock-off member in the path of revolution of the bell cranks for intermittently moving the latter in one direction, and springs normally retracting the bell cranks.

6. In a weeder, a spider rotatable on an axis longitudinally of the weeder, adjustably secured brackets extending from the periphery of the spider with transverse arms on their outer ends, adjustably secured weeding teeth in spaced relation on each transverse arm, a stripper loop around each set of teeth and reciprocable longitudinally thereof, oscillating members on the spider each articulated to a stripping member to reciprocate the latter, a knock-off member in the path of revolution of the oscillatory members to intermittently move the latter in one direction, and springs normally retracting the oscillating members.

7. In a weeder a shaft, a spider secured on said shaft, weeding teeth adjustably secured on the spider periphery, stripper members reciprocable longitudinally of the teeth, oscillating members operatively articulated to the stripper members and pivoted on the spider, springs normally retracting the oscillating members, and a knock-off member in the path of revolution of the oscillating members for intermittently projecting the latter.

8. In a weeder, a frame, a transverse bearing shaft thereon, a shaft operatively connected to the transverse shaft, a spider thereon, brackets extending from the spider, weeding teeth in adjustable spaced relation on each bracket, a stripper member reciprocable longitudinally on each set of teeth, an oscillatory member operatively connected to each stripper member and mounted on the spider, means yieldingly retracting each oscillatory member, and a knock-off member in the path of revolution of the oscillatory members for intermittently projecting the latter.

In testimony whereof I affix my signature in presence of two witnesses.

REUBEN G. BRUNER.

Witnesses:
C. R. STICKNEY,
ANNA M. DORR.

Copies of this patent may be obtained for five cents each, by addressing the "Commissioner of Patents, Washington, D. C."